(12) United States Patent
Bodini et al.

(10) Patent No.: US 11,600,122 B2
(45) Date of Patent: Mar. 7, 2023

(54) METHODS, DEVICES AND ELECTRONIC KEYS FOR ACCESS-RESTRICTED ENVIRONMENTS

(71) Applicant: Infineon Technologies AG, Neubiberg (DE)

(72) Inventors: Emanuele Bruno Bodini, Munich (DE); Matthias Eberl, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/351,320

(22) Filed: Jun. 18, 2021

(65) Prior Publication Data
US 2022/0012963 A1    Jan. 13, 2022

(30) Foreign Application Priority Data
Jul. 7, 2020 (DE) .......................... 102020117824.7

(51) Int. Cl.
*G07C 9/00* (2020.01)
*H04B 7/08* (2006.01)
*H04W 4/80* (2018.01)

(52) U.S. Cl.
CPC ......... *G07C 9/00309* (2013.01); *H04B 7/086* (2013.01); *H04W 4/80* (2018.02); *G07C 2009/00373* (2013.01); *G07C 2009/00555* (2013.01)

(58) Field of Classification Search
CPC ...... G07C 9/00309; G07C 2009/00373; G07C 2009/00555; B60R 25/24; H04W 4/80; H04B 7/086
See application file for complete search history.

(56) References Cited

U.S. PATENT DOCUMENTS

| 9,786,108 | B2 | 10/2017 | Spiess et al. |
| 10,870,413 | B2 * | 12/2020 | Zhu .......................... G01S 5/08 |
| 2005/0038574 | A1 | 2/2005 | Gila et al. |

(Continued)

FOREIGN PATENT DOCUMENTS

| DE | 202011052501 U1 | 4/2012 |
| DE | 102018117941 A1 * | 1/2020 |

(Continued)

*Primary Examiner* — Nabil H Syed
(74) *Attorney, Agent, or Firm* — Harrity & Harrity, LLP (57) ABSTRACT

A method includes determining, by a first radio transceiver of an access-restricted environment, of first direction information of a first radio signal transmitted between the first radio transceiver and a wireless device. The method further includes determining, by a second radio transceiver of the access-restricted environment, of second direction information of a second radio signal transmitted between the second radio transceiver and the wireless device. The method further includes receiving, by the access-restricted environment, of angle information determined by an electronic key associated with the access-restricted environment. The method further includes determining, based on the first direction information, the second direction information and the angle information, whether the wireless device is a relay device or the electronic key. The method can be based, for example, on a Bluetooth technology.

23 Claims, 7 Drawing Sheets

(56) References Cited

U.S. PATENT DOCUMENTS

| | | |
|---|---|---|
| 2006/0164207 A1 | 7/2006 | Wilcox |
| 2015/0189619 A1 | 7/2015 | Kalliola et al. |
| 2015/0235486 A1 | 8/2015 | Ellis et al. |
| 2016/0063786 A1 | 3/2016 | Lewis et al. |
| 2017/0158169 A1* | 6/2017 | Luo .......................... G07C 9/21 |
| 2017/0303090 A1 | 10/2017 | Stitt et al. |
| 2018/0184268 A1 | 6/2018 | Stitt et al. |
| 2019/0006891 A1 | 1/2019 | Park et al. |
| 2019/0053154 A1 | 2/2019 | Song et al. |
| 2019/0297454 A1 | 9/2019 | Smith et al. |
| 2019/0366978 A1* | 12/2019 | Woo ....................... B60R 25/245 |
| 2020/0014099 A1* | 1/2020 | Ghabra ..................... G01S 3/48 |
| 2020/0265662 A1* | 8/2020 | Maiga ................ G07C 9/00174 |

FOREIGN PATENT DOCUMENTS

| | | | |
|---|---|---|---|
| DE | 102018214654 A1 | 3/2020 | |
| KR | 20200050702 | * 5/2020 | ............. B60R 25/10 |
| WO | 2013084030 A1 | 6/2013 | |
| WO | 2019092051 A1 | 5/2019 | |

\* cited by examiner

METHODS, DEVICES AND ELECTRONIC KEYS FOR ACCESS-RESTRICTED ENVIRONMENTS

RELATED APPLICATION

This application claims priority to German Patent Application No. 102020117824.7, filed on Jul. 7, 2020, which is incorporated herein by reference in its entirety.

FIELD

The present disclosure relates to methods, devices and electronic keys for access-restricted environments.

BACKGROUND

Access-restricted environments should be protected against access by unauthorized persons. Criminals, for example, can attempt to gain access to the passenger compartment of a vehicle by means of a relay attack. Security concepts for protecting access-restricted environments are frequently based on ultrawide band (UWB) transmission technology, the use of which can incur high costs. Manufacturers of devices for access-restricted environments are constantly endeavoring to improve their products. In particular, it may be desirable to develop devices which meet certain security standards and can simultaneously be implemented at low cost. It may further be desirable to provide associated methods and electronic keys for access-restricted environments.

SUMMARY

Different aspects relate to a method. The method includes determining, by a first radio transceiver of an access-restricted environment, of first direction information of a first radio signal transmitted between the first radio transceiver and a wireless device. The method further includes determining, by a second radio transceiver of the access-restricted environment, of second direction information of a second radio signal transmitted between the second radio transceiver and the wireless device. The method further includes receiving, by the access-restricted environment, of angle information determined by an electronic key associated with the access-restricted environment. The method further includes determining, based on the first direction information, the second direction information and the angle information, whether the wireless device is a relay device or the electronic key.

Different aspects relate to a device for an access-restricted environment. The device includes a first radio transceiver of the access-restricted environment which is configured to determine first direction information of a first radio signal transmitted between the first radio transceiver and a wireless device. The device further includes a second radio transceiver of the access-restricted environment which is configured to determine second direction information of a second radio signal transmitted between the second radio transceiver and the wireless device. The device further includes a control unit of the access-restricted environment which is configured to determine whether the wireless device is a relay device or an electronic key associated with the access-restricted environment, based on the first direction information, the second direction information and angle information determined by the electronic key.

Different aspects relate to an electronic key which is associated with an access-restricted environment. The electronic key is configured to determine direction information of a radio signal transmitted between the electronic key and a radio transceiver of the access-restricted environment. The electronic key is further configured to determine further direction information of a further radio signal transmitted between the electronic key and a further radio transceiver of the access-restricted environment. The electronic key is further configured to determine angle information based on the two direction information elements. The electronic key is further configured to transmit the angle information to the access-restricted environment.

BRIEF DESCRIPTION OF THE DRAWINGS

Methods and devices according to the disclosure are explained in detail below with reference to drawings. The elements shown in the drawings are not necessarily presented true-to-scale in relation to one another. Identical reference numbers can denote identical components.

DETAILED DESCRIPTION

Figure 1:
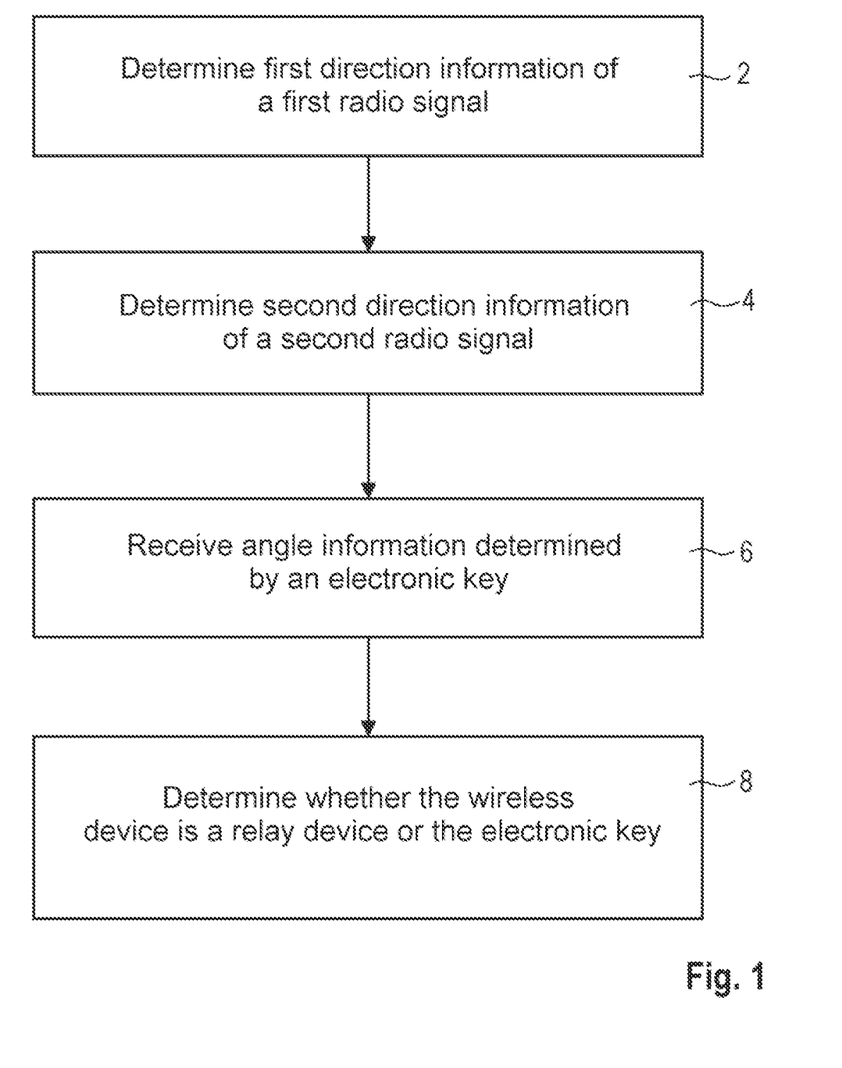
FIG. 1 shows a flow diagram of a method according to the disclosure.

The method shown in FIG. 1 is presented in a general manner in order to describe aspects of the disclosure in qualitative terms. The method can have further aspects which are not shown and described in FIG. 1 for the sake of simplicity. The method can be extended by one or more aspects which are described in connection with other examples according to the disclosure. The method can be extended, for example, by one or more of the aspects which are described in connection with FIG. 2.

At 2, first direction information of a first radio signal transmitted between the first radio transceiver and a wireless device can be determined by a first radio transceiver of an access-restricted environment. At 4, second direction information of a second radio signal transmitted between the second radio transceiver and the wireless device can be determined by a second radio transceiver of the access-restricted environment. At 6, angle information determined by an electronic key associated with the access-restricted environment can be determined by the access-restricted environment. At 8, it can be determined, based on the first direction information, the second direction information and the angle information, whether the wireless device is a relay device or the electronic key.

Figure 2:
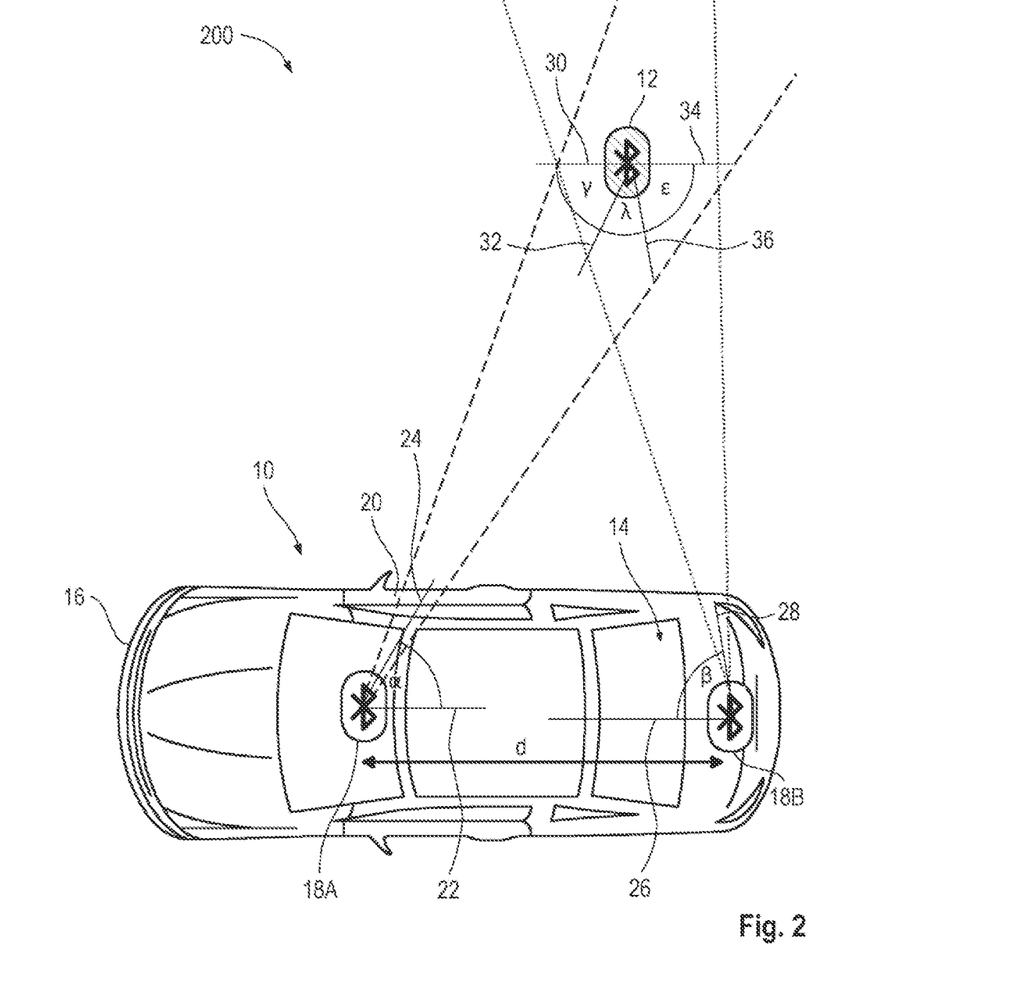
FIG. 2 shows schematically an arrangement 200 with a device for an access-restricted environment and with an electronic key which is associated with the access-restricted environment.

The arrangement 200 shown in FIG. 2 can have an access-restricted environment 10 and an electronic key 12. In the example shown in FIG. 2, the access-restricted environment 10 can be the passenger compartment 14 of a vehicle 16. The vehicle 16 can have a first radio transceiver 18A and a second radio transceiver 18B.

The access-restricted environment 10 can generally be an environment or an area to which access is restricted to a limited group of persons. The access-restricted environment 10 may, for example, be the interior space of an apartment, a house, an office space, a warehouse, a vehicle, a motor vehicle, etc. The limited group of persons may be persons who are in possession of the electronic key 12 associated with the access-restricted environment 10.

The electronic key 12 can be configured, inter alia, to open or unlock an access (e.g. in the form of a door or gate) to the access-restricted environment 10. In the example shown in FIG. 2, the electronic key 12 can be configured to unlock at least one door 20 of the vehicle 16. The electronic key 12 can be a wireless device or wireless communication device. In FIG. 2, the electronic key 12 is configured by way of example as a Bluetooth device (cf. Bluetooth symbol). In one example, the electronic key 12 can be a transponder. In further examples, the electronic key 12 can be a mobile terminal device, such as, for example, a smartphone, a smartwatch, a tablet, etc. In this context, the electronic key 12 can have associated application software in the form of a mobile app.

The first and second radio transceiver 18A, 18B can in each case be a wireless device or wireless communication device. In one example, the radio transceivers 18A, 18B can in each case comprise a Bluetooth low energy beacon. In this context, each of the radio transceivers 18A, 18B and the electronic key 12 can be configured in each case to transmit and/or receive radio signals based on a Bluetooth low energy radio technology. The radio transceivers 18A, 18B can be configured as identical or different.

In the example shown in FIG. 2, the vehicle 16 can have two radio transceivers 18A, 18B which can be separated from one another by a distance d. In further examples, the vehicle can have any number of further radio transceivers as shown and described, for example, in FIGS. 4 to 6. The first radio transceiver 18A can be arranged, for example, in a front area of the vehicle 16, for example in the vehicle cockpit, in the central console or in the front axle of the vehicle 16. The second radio transceiver 18B can be arranged, for example, in a rear area of the vehicle 16, for example in the tailgate, in the trunk or in the rear axle of the vehicle 16. The arrangement of the radio transceivers 18A, 18B in FIG. 2 is shown by way of example and can be chosen differently in further examples.

A person can attempt to gain access to the access-restricted environment 10 or to the passenger compartment 14 of the vehicle 16 using the electronic key 12. In other words, the vehicle door 20 is intended to be unlocked by actuating the electronic key 12. For this purpose, the electronic key 12 can first transmit a request to the vehicle 16 to unlock the vehicle door 20. The vehicle 16 can reply to this with an authentication request to the electronic key 12. In response to this authentication request, the electronic key 12 can transmit authentication data to the vehicle 16. The authentication data can be configured to authenticate an authorization of the electronic key 12 to access the access-restricted environment 10. In response to receiving the authentication data, the vehicle 16 can unlock the vehicle door 20.

By means of the method described below, it can be determined whether a request to unlock the vehicle door 20 and the authentication data are actually transmitted by the electronic key 12 or by a different device, in particular a relay device used in a relay attack. A security check of this type is intended to ensure that access to the passenger compartment 14 of the vehicle 16 is granted to authorized persons only. The described method can be regarded as a more detailed version of the method shown in FIG. 1.

A first radio signal can be transmitted between the first radio transceiver 18A and the electronic key 12. In one example, the first radio signal can be transmitted by the electronic key 12 and can be received by the first radio transceiver 18A. The first radio transceiver 18A can determine first direction information of the first radio signal. The first direction information can, in particular, be a first receive angle $\alpha$ at which the first radio signal is received in the first radio transceiver 18A. The first receive angle $\alpha$ can be measured between a direction 22 and a direction 24. The direction 22 can be a reference direction or a reference plane of the first radio transceiver 18A which can run essentially horizontally in the example shown in FIG. 2. The direction 24 can essentially be a direction defined by a connecting line between the first radio transceiver 18A and the electronic key 12.

Figure 7:
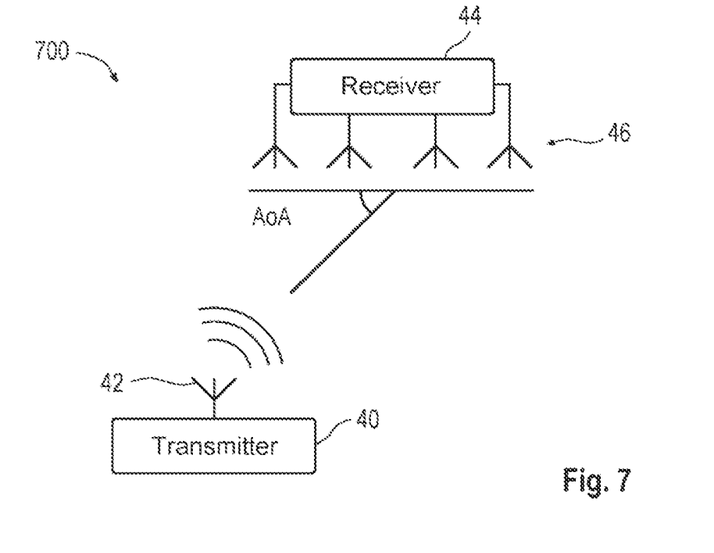
FIG. 7 shows schematically an arrangement 700 for direction determination of a receive signal based on an angle-of-arrival (AoA) method.

In one example, the first receive angle $\alpha$ can be determined based on an angle-of-arrival (AoA) method, as shown and described by way of example in FIG. 7. In this context, the first radio transceiver 18A can comprise an antenna array having a plurality of antennas which is configured to determine the receive angle $\alpha$ based on the AoA method. The electronic key 12 can further have at least one transmit antenna in this context. In further examples, the receive angle $\alpha$ can also be determined based on an angle-of-departure (AoD) method as shown and described by way of example in FIG. 8.

A second radio signal can be transmitted between the second radio transceiver 18B and the electronic key 12. In one example, the second radio signal can be transmitted by the electronic key 12 and can be received by the second radio transceiver 18B. The second radio transceiver 18B can determine second direction information of the second radio signal. The second direction information can, in particular, be a second receive angle $\beta$ at which the second radio signal is received in the second radio transceiver 18B. The second receive angle $\beta$ can be measured between a direction 26 and a direction 28. The direction 26 can be a reference direction or a reference plane of the second radio transceiver 18B which can run essentially horizontally in the example shown in FIG. 2. The direction 28 can essentially be a direction defined by a connecting line between the second radio transceiver 18B and the electronic key 12. The second receive angle $\beta$ can be determined, for example, in a similar manner to the first receive angle $\alpha$.

A third radio signal can be transmitted between the electronic key 12 and the first radio transceiver 18A. In one example, the third radio signal can be transmitted by the first radio transceiver 18A and can be received by the electronic key 12. The electronic key 12 can determine third direction information of the third radio signal. The third direction information can, in particular, be a third receive angle $\gamma$ at which the third radio signal is received in the electronic key 12. The third receive angle $\gamma$ can be measured between a direction 30 and a direction 32. The direction 30 can be a reference direction or a reference plane of the electronic key 12 which can run essentially horizontally in the example shown in FIG. 2. The direction 32 can essentially be a direction defined by a connecting line between the electronic key 12 and the first radio transceiver 18A.

The third receive angle γ can be determined, for example, based on an AoA method. In this context, the electronic key 12 can comprise an antenna array having a plurality of antennas which is configured to determine the receive angle γ based on the AoA method. The first radio transceiver 18A can further have at least one transmit antenna in this context. In further examples, the receive angle γ can also be determined based on an AoD method.

A fourth radio signal can be transmitted between the electronic key 12 and the second radio transceiver 18B. In one example, the fourth radio signal can be transmitted by the second radio transceiver 18B and can be received by the electronic key 12. The electronic key 12 can determine fourth direction information of the fourth radio signal. The fourth direction information can, in particular, be a fourth receive angle ε at which the fourth radio signal is received in the electronic key 12. The fourth receive angle ε can be measured between a direction 34 and a direction 36. The direction 34 can be a reference direction or a reference plane of the electronic key 12 which can run essentially horizontally in the example shown in FIG. 2. The direction 36 can essentially be a direction defined by a connecting line between the electronic key 12 and the second radio transceiver 18B. The fourth receive angle ε can be determined, for example, in a similar manner to the third receive angle γ.

Direction information λ can be determined by means of the electronic key 12. In the example shown in FIG. 2, the angle information λ can be determined based on an equation $$\lambda = 180° - (\gamma + \varepsilon) \quad (1).$$

The direction information λ can therefore be the angle λ between the directions 32 and 36. The direction information λ can be transmitted from the electronic key 12 to a component of the access-restricted environment 10 or of the vehicle 16. A component of this type may, for example, be one or more control units of the logic units (not shown) which can be configured to process the received direction information. A control unit can be configured, for example, in the form of a microprocessor, a microcontroller, a digital signal processor, etc.

By means of the control unit of the vehicle 16, it can be determined whether a condition $$\lambda + \alpha + \beta = 180° \quad (2)$$

is satisfied. A prerequisite of a check on the equality condition (2) can be that the receive angles α, ß, γ and ε have been precisely determined. In practice, allowing for tolerances for errors which can occur in determining the receive angles α, ß, γ and ε, it can be determined whether the condition $$\lambda + \alpha + \beta \approx 180° \quad (3)$$

is satisfied.

If the condition (3) is satisfied, it can be determined by means of the control unit that the electronic key 12 is actually an electronic key associated with the access-restricted environment 10. The control unit can then provide a signal to unlock the vehicle door 20 so that it can be unlocked by means of a suitable unlocking mechanism. If condition (3) is not satisfied, it can be determined by the control unit that a request to unlock the vehicle 16 has been transmitted by a relay device. An example of a relay attack carried out on the arrangement 200 is shown and described in FIG. 3.

In the example shown in FIG. 2, the angles γ, ε and λ can be determined by the electronic key 12. In a further example, the electronic key 12 can only determine the angles γ and ε and transmit this angle information to the control unit of the vehicle 16. The direction information λ can then alternatively be determined by the control unit.

In a further step, an additional safety check can be carried out. A distance between the access-restricted environment 10 and the wireless device 12 can be determined by means of a trigonometric calculation. In particular, distances between the wireless device 12 and the radio transceivers 18A, 18B can be calculated trigonometrically based on the distance d between the radio transceivers 18A, 18B and the receive angles α, ß. If a distance between the access-restricted environment 10 and the wireless device 12 exceeds a predefined threshold value, the wireless device 12 may possibly not be an electronic key associated with the access-restricted environment 10, but rather a relay device by means of which a relay attack is carried out (cf. FIG. 3). In this case, an unlocking of the access-restricted environment 10 or the passenger compartment 14 can be blocked in order to prevent a possible relay attack.

In another further step, a further safety check can be carried out. It can be determined based on the angles α and ß whether a position of the electronic key 12 lies inside or outside the access-restricted environment 10 or the passenger compartment 14. In one example, it may be appropriate to allow an engine of the vehicle 16 to start only if the position of the electronic key 12 lies inside the vehicle passenger compartment 14. A starting of the engine of the vehicle 16 can thus be blocked if the position of the electronic key 12 lies outside the passenger compartment 14.

Figure 3:
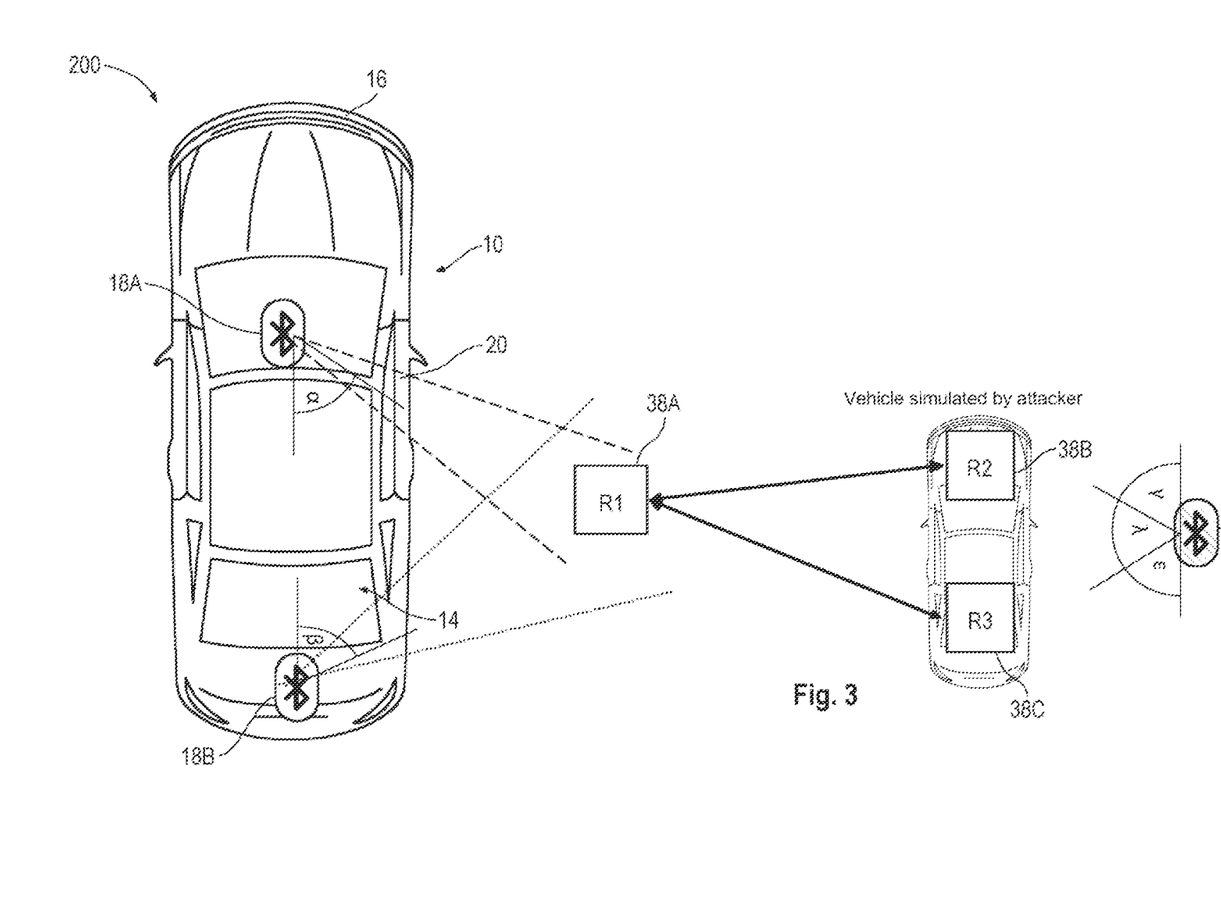
FIG. 3 shows schematically a relay attack on the arrangement 200 shown in FIG. 2.

FIG. 3 shows schematically a relay attack carried out on the arrangement 200 from FIG. 2. It can be determined by means of the method described below whether a request to unlock the vehicle door 20 and the authentication data have been transmitted by a relay device during a relay attack. The method can be regarded as a more detailed version of the method shown in FIG. 1.

In a relay attack, an unauthorized attacker can attempt to gain access to the passenger compartment 14 of the vehicle 16 by using a relay device 38. The relay device 38 can have a plurality of relay components 38A to 38C. A first relay component 38A can be configured to forward data from the access-restricted environment 10 or from the vehicle 16 to the second and third relay components 38B and 38C. The relay components 38B and 38C can be configured to forward data from the first relay component 38A to the electronic key 12 and vice versa. The relay components 38B and 38C can further be configured to simulate the vehicle 16, including the first and second radio transceivers 38A and 38B. The relay components 38B and 38C can, for example, in each case have an antenna array having a plurality of antennas for this purpose.

In a relay attack, a request to unlock the vehicle door 20 can be transmitted to the vehicle 16 by the first relay component 38A. The first relay component 38A can be located, in particular, close to the vehicle 16 for this purpose. In response to the request, the vehicle 16 can reply with an authentication request to the first relay component 38A. The first relay device 38A can forward this authentication request to the second and third relay components 38B and 38C. The second and third relay components 38B and 38C can simulate the radio transceivers 18A, 18B of the vehicle 16 and forward the authentication request to the electronic key 12. The second and third relay components 38B and 38B can be located, in particular, close to the electronic key 12 for this purpose. In response to the request, the electronic key 12 can transmit its authentication data to the second and third relay components 38B and 38C, wherein said authentication data can be forwarded via the first relay component 38A to the vehicle 16. The data transmitted between the vehicle 16 and the electronic key 12 can be forwarded by the relay device 38 without additional data processing. The data forwarded by the relay component 18 can therefore be encrypted or unencrypted.

As in the method shown in FIG. 2, the angles α, ß can be determined by the radio transceivers 18A, 18B and the angles γ, ε, λ by the electronic key 12 in FIG. 3. It can finally be determined by a control unit of the vehicle 16 whether condition (3) is satisfied or not. However, due to the relay device 38 connected between the vehicle 16 and the electronic key 12, condition (3) cannot normally be satisfied for geometric reasons. It can thus be determined by the control unit that the received data have been received from the relay device 38 and not from the electronic key 12. Since a relay attack must consequently be assumed, an unlocking of the access-restricted environment 10 or the passenger compartment 14 can be blocked by the control unit.

The methods described in connection with FIGS. 1 to 3 represent an effective detection and prevention of relay attacks. In particular, the described methods can be based on a Bluetooth low energy radio technology. Compared with methods based on UWB transmission technologies, the methods shown in FIGS. 1 to 3 can thus be more economical, since expensive UWB hardware no longer needs to be used. In addition, methods according to the disclosure can offer a reduced power consumption and therefore an increased service life of the battery of the electronic key 12.

Figure 4:
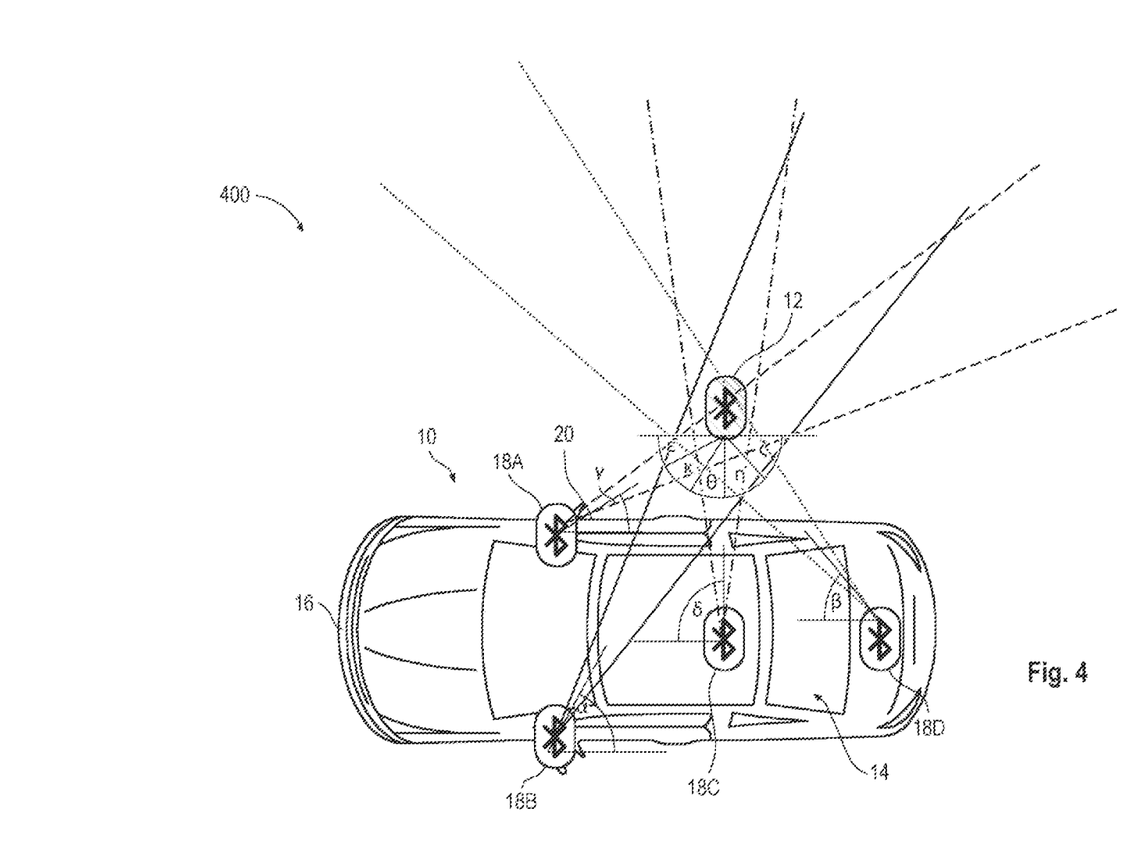
FIG. 4 shows schematically an arrangement 400 with a device for an access-restricted environment and with an electronic key which is associated with the access-restricted environment.

The arrangement 400 shown in FIG. 4 can be at least partially similar to the arrangement 200 shown in FIG. 2. In contrast to FIG. 2, the access-restricted environment 10 shown in FIG. 4 can have more than two radio transceivers. In FIG. 4, the access-restricted environment 10 can, by way of example, have four radio transceivers 18A to 18D. A first and second radio transceiver 18A and 18B can be arranged in each case in a lateral area of the vehicle 16, for example in the wing mirrors of the vehicle 16. A third radio transceiver 18C can be arranged in a central area of the vehicle 16. A fourth radio transceiver 18D can be arranged, for example, in a rear area of the vehicle 16, for example in the tailgate, in the trunk or in the rear axle of the vehicle 16.

Each of the radio transceivers 18A to 18D can be configured to determine, in the respective radio transceiver, a receive angle (cf. α, ß, γ, δ) of a radio signal transmitted between the respective radio transceiver and the electronic key 12. The first radio transceiver 18A, for example, can be configured to determine the receive angle α. The electronic key 12 can further be configured to determine, in the electronic key 12, direction information of a radio signal transmitted between the respective radio transceiver and the electronic key 12 (cf. angles ε, κ, η, ς).

The angle θ can be determined according to $$\theta = 180° - (\varepsilon + \kappa + \eta + \varsigma) \quad (4)$$

by means of the electronic key 12 and can be transmitted to a control unit of the vehicle 16. It can be determined, for example, by means of the control unit of the vehicle 16 whether a condition $$\theta + \alpha + \delta \approx 180° \quad (5)$$

is satisfied. If condition (5) is satisfied, it can be determined by means of the control unit that the electronic key 12 is actually an electronic key associated with the access-restricted environment 10 and not a relay device. It is evident from FIG. 4 that one or more further conditions can be verified in which, for example, triangular sums can similarly be checked.

Compared with FIG. 2, an increased precision of the position determination of the electronic key 12 can be provided by using more than two radio transceivers 18A to 18D in FIG. 4. With only two radio transceivers, for example, a checking of condition (3) in the example shown in FIG. 2 can be problematic if the electronic key 12 and the two radio transceivers 18A, 18B are arranged essentially in a line. Such problematic positions of the electronic key 12 can also be determined with adequate precision by using a plurality of radio transceivers.

Figure 5:
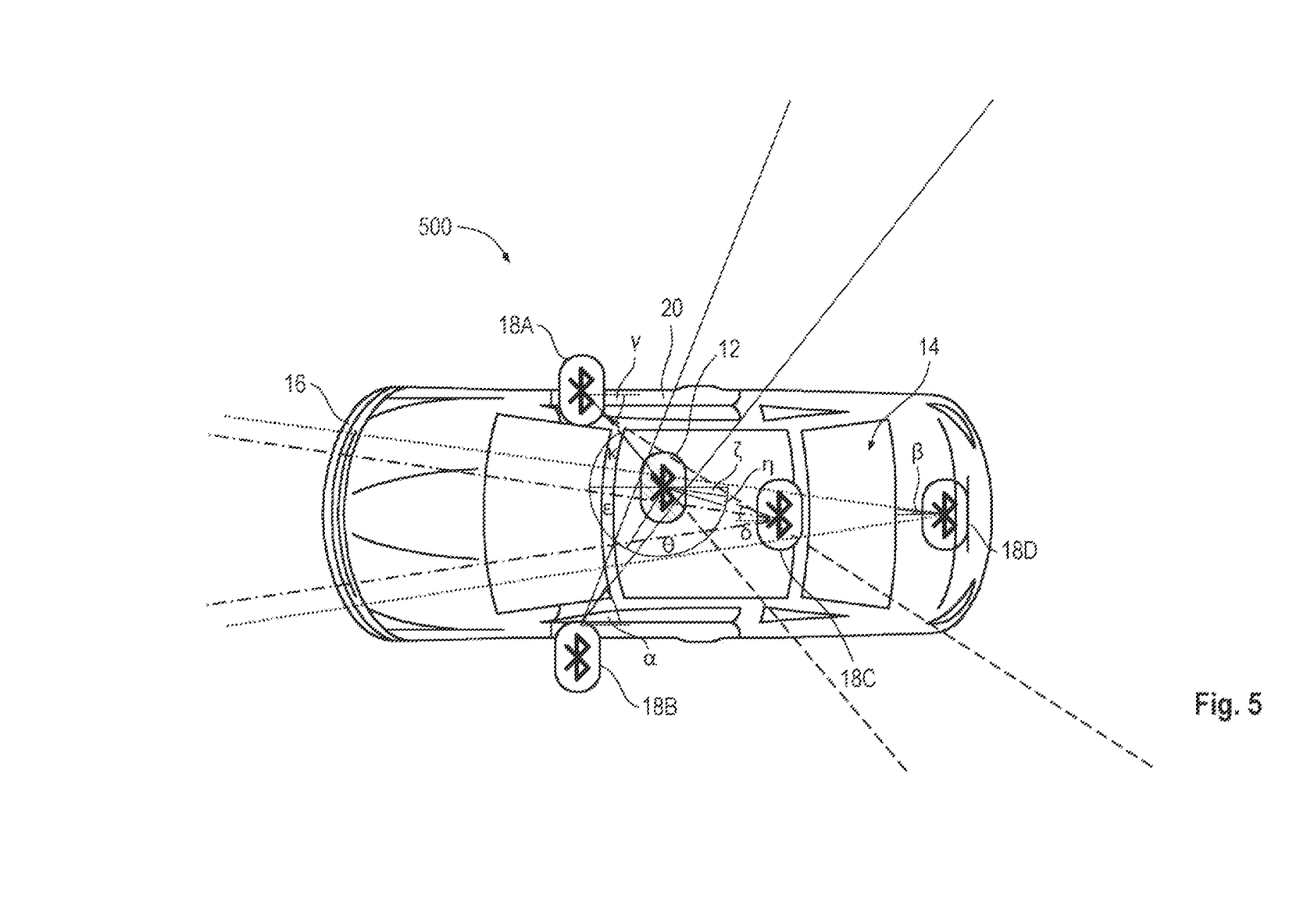
FIG. 5 shows schematically an arrangement 500 with a device for an access-restricted environment and with an electronic key which is associated with the access-restricted environment.

The arrangement 500 shown in FIG. 5 can be at least partially similar to the arrangement 400 shown in FIG. 4. In contrast to FIG. 4, the electronic key 12 can be located inside the access-restricted environment 10 or the passenger compartment 14 of the vehicle 16 in the scenario shown in FIG. 5. The security checks described in connection with preceding figures can be carried out in a similar manner in the scenario shown in FIG. 5.

Figure 6:
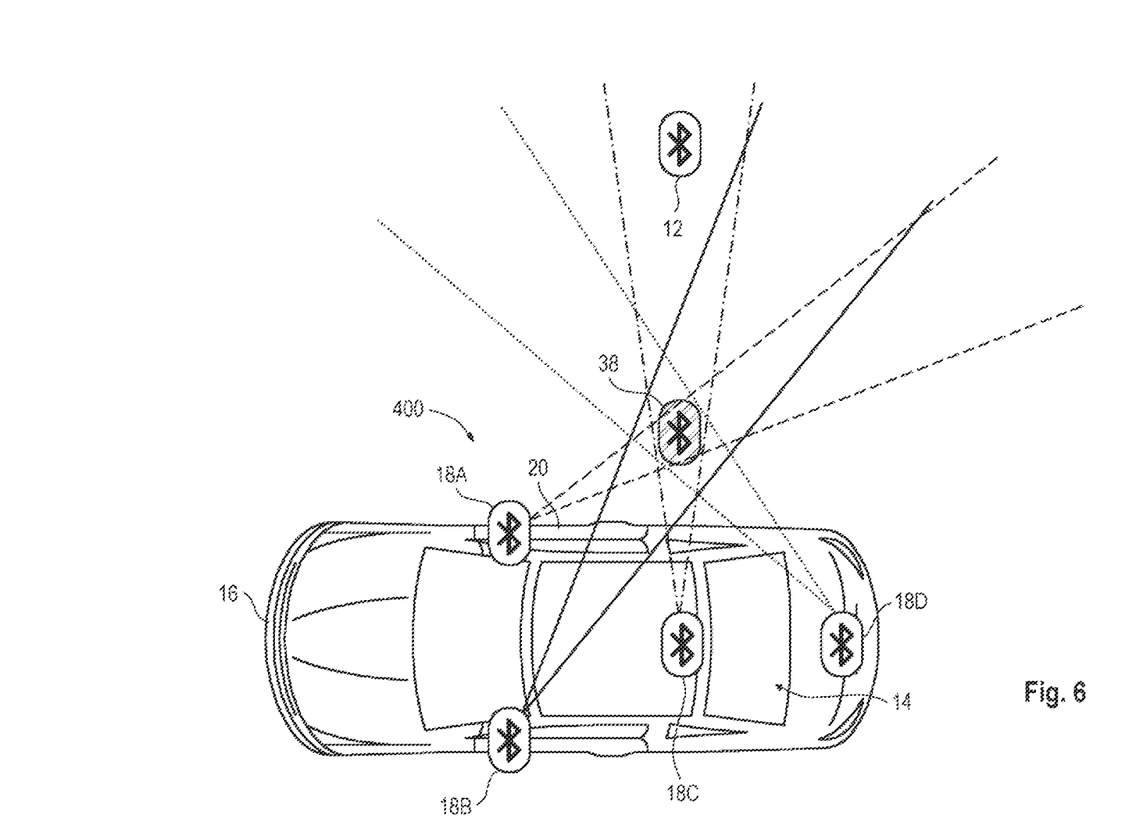
FIG. 6 shows schematically a relay attack on the arrangement 400 shown in FIG. 4.

FIG. 6 shows schematically a relay attack on the arrangement 400 shown in FIG. 4. It can be established, for example, by checking condition (5) that a relay attack is being carried out by a relay device 38 in the scenario shown in FIG. 6. In this case, for example, an unlocking of the vehicle passenger compartment 14 can be blocked.

FIG. 7 shows schematically an arrangement 700 for direction determination of a receive signal based on an angle-of-arrival (AoA) method. The arrangement 700 can have a transmitter 40 with at least one antenna 42, and also a receiver 44 with at least one antenna array 46 having a plurality of antennas. In the AoA method, the transmitter 40, as a device to which the direction is determined, can transmit a special direction-finding signal with a single antenna. If the transmitted signal crosses the antenna array 46 of the receiver 44, the receiver 44 sees a signal phase difference due to the different distance between the single antennas in the antenna array 46 and the transmit antenna 42. The receiver 44 can determine IQ sampling values of the signal while it switches over between the active antenna in the antenna array 46. The receiver 44 can calculate the signal direction based on the IQ sampling data.

Figure 8:
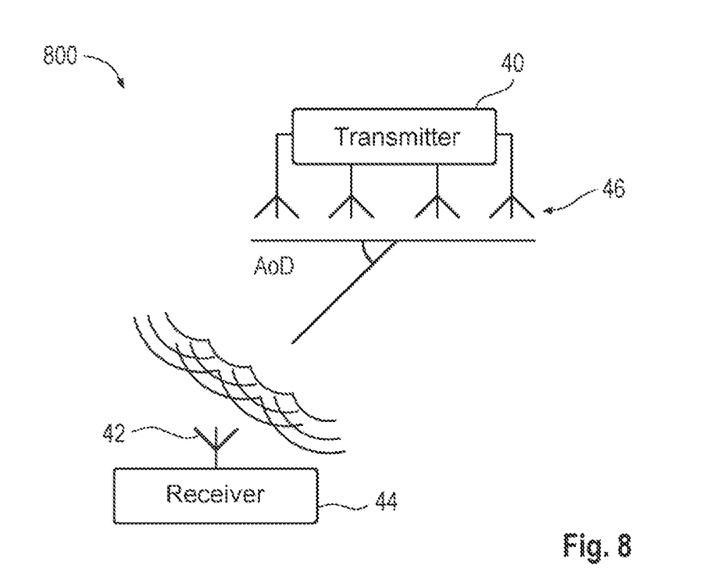
FIG. 8 shows schematically an arrangement 800 for direction determination of a receive signal based on an angle-of-departure (AoD) method.

FIG. 8 shows schematically an arrangement 800 for direction determination of a receive signal based on an angle-of-departure (AoD) method. The arrangement 800 can have a transmitter 40 with at least one antenna 46 having a plurality of antennas, and also a receiver 44 with at least one antenna array 42. In the AoD method, the transmitter 40, as a device to which the direction is determined, can transmit a special signal using the antennas of the antenna array 46. If the plurality of signals transmitted by the transmitter 40 cross the antenna 42 of the receiver 44, the receiver 44 can determine IQ sampling values. The receiver 44 can calculate the signal direction based on the IQ sampling values.

Examples

Methods and devices according to the disclosure are explained below based on examples.

Example 1 is a method, comprising: determining, by a first radio transceiver of an access-restricted environment, of first direction information of a first radio signal transmitted between the first radio transceiver and a wireless device; determining, by a second radio transceiver of the access-restricted environment, of second direction information of a second radio signal transmitted between the second radio transceiver and the wireless device; receiving, by the access-restricted environment, of angle information determined by an electronic key associated with the access-restricted environment; and determining, based on the first direction information, the second direction information and the angle information, whether the wireless device is a relay device or the electronic key.

Example 2 is a method according to example 1, further comprising: blocking an unlocking of the access-restricted environment if the wireless device is a relay device.

Example 3 is a method according to example 1 or 2, wherein: determining the first direction information comprises determining a first receive angle of the first radio signal in the first radio transceiver, and determining the second information comprises determining a second receive angle of the second radio signal in the second radio transceiver.

Example 4 is a method according to example 3, wherein determining the first receive angle and determining the second receive angle are in each case based on an angle-of-arrival method.

Example 5 is a method according to one of the preceding examples, further comprising: determining of the angle information by the electronic key; and transmitting the angle information from the electronic key to the access-restricted environment.

Example 6 is a method according to example 5, wherein determining the angle information comprises: determining, by the electronic key, of third direction information of a third radio signal transmitted between the electronic key and a radio transceiver; and determining, by the electronic key, of fourth direction information of a fourth radio signal transmitted between the electronic key and a further radio transceiver.

Example 7 is a method according to example 6, wherein: determining the third direction information comprises determining a third receive angle of the third radio signal in the electronic key, and determining the fourth direction information comprises determining a fourth receive angle of the fourth radio signal in the electronic key.

Example 8 is a method according to example 7, wherein determining the third receive angle and determining the fourth receive angle are in each case based on an angle-of-arrival method.

Example 9 is a method according to example 7 or 8, wherein determining the angle information is based on an equation $A=180°-(\gamma+\varepsilon)$, where $\lambda$ is the angle information, $\gamma$ is the third receive angle and $\varepsilon$ is the fourth receive angle.

Example 10 is a method according to example 9, wherein determining whether the wireless device is a relay device or the electronic key comprises: determining whether a condition $\lambda+\alpha+\beta\approx 180°$ is satisfied, where $\lambda$ is the angle information, $\alpha$ is the first receive angle and $\beta$ is the second receive angle, determining that the wireless device is a relay device if the condition is not satisfied, and determining that the wireless device is the electronic key if the condition is satisfied.

Example 11 is a method according to one of examples 3 to 10, further comprising: trigonometrically calculating a distance between the access-restricted environment and the wireless device based on the first receive angle, the second receive angle and a distance between the first radio transceiver and the second radio transceiver.

Example 12 is a method according to example 11, further comprising: blocking an unlocking of the access-restricted environment if the distance between the access-restricted environment and the wireless device exceeds a predefined threshold value.

Example 13 is a method according to one of the preceding examples, further comprising: determining, based on the first direction information and the second direction information, whether a position of the electronic key lies inside or outside the access-restricted environment.

Example 14 is a method according to one of the preceding examples, wherein the access-restricted environment is a vehicle.

Example 15 is a method according to example 14, further comprising: blocking a starting of an engine of the vehicle if the position of the electronic key lies outside the access-restricted environment.

Example 16 is a method according to one of the preceding examples, wherein the first radio signal and the second radio signal are transmitted based on a Bluetooth low energy radio technology.

Example 17 is a method according to one of the preceding examples, further comprising: determining, by a further radio transceiver of the access-restricted environment, of further direction information of a further radio signal transmitted between the further radio transceiver of the access-restricted environment and the wireless device, wherein determining whether the wireless device is a relay device or the electronic key is further based on the further direction information.

Example 18 is a device for an access-restricted environment, comprising: a first radio transceiver of the access-restricted environment which is configured to determine first direction information of a first radio signal transmitted between the first radio transceiver and a wireless device; a second radio transceiver of the access-restricted environment which is configured to determine second direction information of a second radio signal transmitted between the second radio transceiver and a wireless device; and a control unit of the access-restricted environment which is configured to determine whether the wireless device is a relay device or an electronic key associated with the access-restricted environment, based on the first direction information, the second direction information and angle information determined by the electronic key.

Example 19 is a device according to example 18, wherein the first radio transceiver and the second radio transceiver in each case comprise a Bluetooth low energy beacon.

Example 20 is a device according to example 18 or 19, wherein the first radio transceiver and the second radio transceiver in each case comprise an antenna array having a plurality of antennas which is configured to determine a receive angle of a signal based on an angle-of-arrival method.

Example 21 is an electronic key which is associated with an access-restricted environment and is configured: to determine direction information of a radio signal transmitted between the electronic key and a radio transceiver of the access-restricted environment, to determine further direction information of a further radio signal transmitted between the electronic key and a further radio transceiver of the access-restricted environment, to determine angle information based on the two direction information elements, and to transmit the angle information to the access-restricted environment.

Example 22 is an electronic key according to example 21, wherein the electronic key comprises a wireless Bluetooth device.

Example 23 is an electronic key according to example 21 or 22, wherein the electronic key comprises an antenna array having a plurality of antennas which is configured to determine a receive angle of a signal based on an angle-of-arrival method.

Although specific embodiments are presented and described herein, it is obvious to the person skilled in the art that a multiplicity of alternative and/or equivalent implementations can replace the shown and described specific embodiments without departing the scope of the present disclosure. This application is intended to cover all adaptations or variations of the specific embodiments discussed herein. It is therefore intended that this disclosure is limited only by the claims and their equivalents.

What is claimed is:

1. A method, comprising:
    determining, by a first radio transceiver of an access-restricted environment, first direction information of a first radio signal transmitted between the first radio transceiver and a wireless device;
    determining, by a second radio transceiver of the access-restricted environment, second direction information of a second radio signal transmitted between the second radio transceiver and the wireless device;
    determining, by an electronic key associated with the access-restricted environment, third direction information of a third radio signal transmitted between the electronic key and the first radio transceiver, including determining a third receive angle of the third radio signal by the electronic key;
    determining, by the electronic key, fourth direction information of a fourth radio signal transmitted between the electronic key and the second radio transceiver, including determining a fourth receive angle of the fourth radio signal by the electronic key;
    determining, by the electronic key, angle information based on an equation $\lambda=180°-(\gamma+\varepsilon)$, where $\lambda$ is the angle information, $\gamma$ is the third receive angle, and $\varepsilon$ is the fourth receive angle;
    transmitting the angle information from the electronic key to the access-restricted environment;
    receiving, by the access-restricted environment, the angle information determined by the electronic key; and
    determining, based on the first direction information, the second direction information and the angle information, whether the wireless device is a relay device or the electronic key.

2. The method as claimed in claim 1, further comprising:
    blocking an unlocking of the access-restricted environment if the wireless device is determined to be the relay device.

3. The method as claimed in claim 1, wherein:
    determining the first direction information comprises determining a first receive angle of the first radio signal in the first radio transceiver, and
    determining the second direction information comprises determining a second receive angle of the second radio signal in the second radio transceiver.

4. The method as claimed in claim 3, wherein determining the first receive angle and determining the second receive angle are in each case based on an angle-of-arrival method.

5. The method as claimed in claim 1, wherein determining the third receive angle and determining the fourth receive angle are in each case based on an angle-of-arrival method.

6. The method as claimed in claim 3, wherein determining whether the wireless device is the relay device or the electronic key comprises:
    determining whether a condition $\lambda+\alpha+\beta\approx180°$ is satisfied, where $\lambda$ is the angle information, $\alpha$ is the first receive angle, and $\beta$ is the second receive angle,
    determining that the wireless device is a relay device if the condition is not satisfied, and
    determining that the wireless device is the electronic key if the condition is satisfied.

7. The method as claimed in claim 3, further comprising:
    trigonometrically calculating a distance between the access-restricted environment and the wireless device based on the first receive angle, the second receive angle, and a distance between the first radio transceiver and the second radio transceiver.

8. The method as claimed in claim 7, further comprising:
    blocking an unlocking of the access-restricted environment if the distance between the access-restricted environment and the wireless device exceeds a predefined threshold value.

9. The method as claimed in claim 1, further comprising:
    determining, based on the first direction information and the second direction information, whether a position of the electronic key lies inside or outside the access-restricted environment.

10. The method as claimed in claim 9, wherein the access-restricted environment is a vehicle.

11. The method as claimed in claim 10, further comprising:
    blocking a starting of an engine of the vehicle if the position of the electronic key lies outside the access-restricted environment.

12. The method as claimed in claim 1, wherein the first radio signal and the second radio signal are transmitted based on a Bluetooth low energy radio technology.

13. The method as claimed in claim 1, further comprising:
    determining, by a further radio transceiver of the access-restricted environment, further direction information of a further radio signal transmitted between the further radio transceiver of the access-restricted environment and the wireless device,
    wherein determining whether the wireless device is a relay device or the electronic key is further based on the further direction information.

14. A device for an access-restricted environment, comprising:
    a first radio transceiver of the access-restricted environment which is configured to determine first direction information of a first radio signal transmitted between the first radio transceiver and a wireless device;
    a second radio transceiver of the access-restricted environment which is configured to determine second direction information of a second radio signal transmitted between the second radio transceiver and the wireless device,
    wherein the first radio transceiver is configured to transmit a third radio signal to an electronic key associated with the access-restricted environment,
    wherein the second radio transceiver is configured to transmit a fourth radio signal to the electronic key; and
    a controller of the access-restricted environment which is configured to receive angle information from the electronic key based on the third radio signal and the fourth radio signal, and determine whether the wireless device is a relay device or the electronic key based on the first direction information, the second direction information, and the angle information,
wherein the first direction information includes a first receive angle,
wherein the second direction information includes a second receive angle, and
wherein the controller is configured to determine that the wireless device is the electronic key on a condition $\lambda+\alpha+\beta\approx180°$ is satisfied and determine that the wireless device is the relay device on the condition $\lambda+\alpha+\beta\approx180°$ is not satisfied, where $\lambda$ is the angle information, $\alpha$ is the first receive angle, and $\beta$ is the second receive angle.

15. The device as claimed in claim 14, wherein the first radio signal and the second radio signal are Bluetooth low energy beacons.

16. The device as claimed in claim 14, wherein the first radio transceiver comprises a first antenna array having a first plurality of antennas configured to determine a first receive angle of the first radio signal as the first direction information based on a first angle-of-arrival method, and the second radio transceiver comprises a second antenna array having a second plurality of antennas configured to determine a second receive angle of the second radio signal as the second direction information based on a second angle-of-arrival method.

17. An electronic key that is associated with an access-restricted environment, the electronic key comprising:
at least one processor and a first radio transceiver cooperatively configured to:
determine first direction information of a first radio signal transmitted between the electronic key and a second radio transceiver of the access-restricted environment, wherein the first direction information is a first receive angle at which the first radio signal is received by the electronic key relative to a first reference direction,
determine second direction information of a second radio signal transmitted between the electronic key and a third radio transceiver of the access-restricted environment, wherein the second direction information is a second receive angle at which the second radio signal is received by the electronic key relative to a second reference direction,
determine angle information based on the first direction information and the second direction information, wherein the angle information is calculated based on an equation $\lambda=180°-(\beta+\varepsilon)$, where $\lambda$ is the angle information, $\gamma$ is the first receive angle, and $\varepsilon$ is the second receive angle, and
transmit the angle information to the access-restricted environment.

18. The electronic key as claimed in claim 17, wherein the first radio transceiver is a wireless Bluetooth device.

19. The electronic key as claimed in claim 17, wherein the electronic key comprises an antenna array having a plurality of antennas, wherein the electronic key is configured to use the antenna array to determine the first receive angle of the first radio signal as the first direction information and determine the second receive angle of the second radio signal as the second direction information based on an angle-of-arrival method.

20. The method as claimed in claim 1, wherein:
during a transmission of the third radio signal, the third radio signal originates from the first radio transceiver; and
during a transmission of the fourth radio signal, the fourth radio signal originates from the second radio transceiver.

21. The method as claimed in claim 1, wherein:
during transmission of the fourth radio signal, the third radio signal is transmitted by the first radio transceiver; and
during transmission of the fourth radio signal, the fourth radio signal is transmitted by the second radio transceiver.

22. The method as claimed in claim 1, wherein the relay device is an unauthorized device with respect to the access-restricted environment and the electronic key is an authorized device with respect to the access-restricted environment.

23. A method, comprising:
determining, by a first radio transceiver of an access-restricted environment, first direction information of a first radio signal transmitted between the first radio transceiver and a wireless device;
determining, by a second radio transceiver of the access-restricted environment, second direction information of a second radio signal transmitted between the second radio transceiver and the wireless device;
determining, by an electronic key associated with the access-restricted environment, third direction information of a third radio signal transmitted between the electronic key and the first radio transceiver, including determining a third receive angle of the third radio signal at the electronic key;
determining, by the electronic key, of fourth direction information of a fourth radio signal transmitted between the electronic key and the second radio transceiver, including determining a fourth receive angle of the fourth radio signal at the electronic key;
determining of angle information by the electronic key or by the access-restricted environment, including determining the angle information based on an equation $\lambda=180°-(\gamma+\varepsilon)$, where $\lambda$ is the angle information, $\gamma$ is the third receive angle, and $\varepsilon$ is the fourth receive angle; and
determining, by the access-restricted environment, based on the first direction information, the second direction information, and the angle information, whether the wireless device is a relay device or the electronic key.

* * * * *